(12) United States Patent
Sun et al.

(10) Patent No.: US 10,698,738 B1
(45) Date of Patent: Jun. 30, 2020

(54) IMPLEMENTING A BLOCKCHAIN-BASED WORKFLOW

(71) Applicant: Alibaba Group Holding Limited, George Town (KY)

(72) Inventors: Shanlu Sun, Hangzhou (CN); Shubo Li, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/712,412

(22) Filed: Dec. 12, 2019

Related U.S. Application Data

(63) Continuation of application No. PCT/CN2019/093371, filed on Jun. 27, 2019.

(51) Int. Cl.
| | | |
|---|---|---|
| *H04L 9/00* | (2006.01) | |
| *G06F 9/50* | (2006.01) | |
| *G06F 9/48* | (2006.01) | |
| *H04L 9/06* | (2006.01) | |

(52) U.S. Cl.
CPC ............ *G06F 9/5072* (2013.01); *G06F 9/485* (2013.01); *H04L 9/0637* (2013.01)

(58) Field of Classification Search
CPC . H04L 2209/38; H04L 9/0637; H04L 9/0643; H04L 67/1093; G06F 21/60; G06F 3/00; G06F 16/1834; G06F 21/602
See application file for complete search history.

(56) References Cited

U.S. PATENT DOCUMENTS

| | | |
|---|---|---|
| 2010/0268759 A1 | 10/2010 | Hepper et al. |
| 2017/0178127 A1 | 6/2017 | Kravitz |
| 2017/0372300 A1 | 12/2017 | Dunlevy et al. |

(Continued)

FOREIGN PATENT DOCUMENTS

| | | |
|---|---|---|
| CN | 106372514 | 2/2017 |
| CN | 107169765 | 9/2017 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Dong U Kim
(74) *Attorney, Agent, or Firm* — Fish & Richardson P.C.

(57) ABSTRACT

Disclosed herein are methods, systems, and apparatus, including computer programs encoded on computer storage media, for implementing a blockchain-based workflow. One of the methods includes receiving a workflow specification that indicates one or more state transition methods to be performed by a smart contract on a blockchain network and one or more client service methods to be performed by one or more client devices off the blockchain network participating in a workflow. The smart contract is generated according to the workflow specification and includes the one or more state transition methods. A configurable client service logic is generated according to the workflow specification for each of the one or more client devices and includes the one or more client service methods. The smart contract is deployed to the blockchain network.

24 Claims, 6 Drawing Sheets

(56) References Cited

U.S. PATENT DOCUMENTS

| | | | |
|---|---|---|---|
| 2018/0089645 A1 | 3/2018 | McDonald et al. | |
| 2018/0108089 A1 | 4/2018 | Jayachandran | |
| 2018/0117446 A1 | 5/2018 | Tran et al. | |
| 2018/0117447 A1* | 5/2018 | Tran | B33Y 10/00 |
| 2018/0137465 A1* | 5/2018 | Batra | G06Q 10/103 |
| 2018/0174255 A1* | 6/2018 | Hunn | G06Q 10/10 |
| 2018/0219676 A1 | 8/2018 | Mattingly et al. | |
| 2018/0315145 A1* | 11/2018 | Darnell | G06Q 50/205 |
| 2019/0013932 A1 | 1/2019 | Maino et al. | |
| 2019/0051390 A1* | 2/2019 | Shah | G16H 10/60 |
| 2019/0102755 A1 | 4/2019 | Owens et al. | |
| 2019/0108140 A1 | 4/2019 | Deshpande et al. | |
| 2019/0123889 A1 | 4/2019 | Schmidt-Karaca | |
| 2019/0132350 A1* | 5/2019 | Smith | G06F 21/577 |
| 2019/0147174 A1* | 5/2019 | Narasimhan | G06F 21/105 726/29 |
| 2019/0188804 A1 | 6/2019 | Parry | |
| 2019/0251199 A1* | 8/2019 | Klianev | G06F 16/2365 |
| 2019/0340269 A1* | 11/2019 | Biernat | G05B 19/4093 |
| 2019/0384842 A1* | 12/2019 | Rao | G06F 16/27 |
| 2020/0028691 A1* | 1/2020 | Rao | G06Q 10/06 |

FOREIGN PATENT DOCUMENTS

| | | |
|---|---|---|
| CN | 108573341 | 9/2018 |
| CN | 108898021 | 11/2018 |
| CN | 108965247 | 12/2018 |
| CN | 109034833 | 12/2018 |
| CN | 109544192 | 3/2019 |
| CN | 109639646 | 4/2019 |
| CN | 109767190 | 5/2019 |

OTHER PUBLICATIONS docs.microsoft.com [online], "Blockchain Workflow Application," Dec. 2019, retrieved on Jan. 31 2020, retrieved from URL<https://docs.microsoft.com/en-us/azure/architecture/solution-ideas/articles/blockchain-workflow-application>, 4 pages.

Nakamoto, "Bitcoin: A Peer-to-Peer Electronic Cash System," www.bitcoin.org, 2005, 9 pages.

U.S. Appl. No. 16/711,952, filed Dec. 12, 2019, Gu et al.

U.S. Appl. No. 16/712,340, filed Dec. 12, 2019, Gu et al.

PCT International Search Report and Written Opinion in International Application No. PCT/CN2019/093349, dated Mar. 27, 2020, 7 pages.

PCT International Search Report and Written Opinion in International Application No. PCT/CN2019/093371, dated Mar. 27, 2020, 8 pages.

PCT International Search Report and Written Opinion in International Application No. PCT/CN2019/093365, dated Mar. 27, 2020, 6 pages.

\* cited by examiner

IMPLEMENTING A BLOCKCHAIN-BASED WORKFLOW

CROSS-REFERENCE TO RELATED APPLICATIONS

This application is a continuation of PCT Application No. PCT/CN2019/093371, filed on Jun. 27, 2019, which is hereby incorporated by reference in its entirety.

TECHNICAL FIELD

This specification relates to implementing a blockchain-based workflow.

BACKGROUND

Distributed ledger systems (DLSs), which can also be referred to as consensus networks, and/or blockchain networks, enable participating entities to securely and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

A workflow generally includes a series of activities for completing a task. A workflow can be automated with software tools that apply rules to decide whether one step has been completed successfully and when a next step can begin. In some instances, a workflow system can be designed to compose and execute a series of computational or data manipulation steps. However, complexity of implementing a workflow system can result in low processing efficiency of the workflow system. Therefore, solutions for improving efficiency of workflow systems would be desirable.

SUMMARY

This specification describes technologies for implementing a blockchain-based workflow. These technologies generally involve implementing a workflow system based on a blockchain network. A workflow can be used in highway construction, airplane manufacturing, ship building, ecommerce, or any other applications. In some embodiments, integrating a workflow with a blockchain network can help simplify implementation of the workflow and improve security and efficiency of the workflow system.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings and from the claims.

BRIEF DESCRIPTION OF THE DRAWINGS

Like reference numbers and designations in the various drawings indicate like elements.

DETAILED DESCRIPTION

Figure 1:
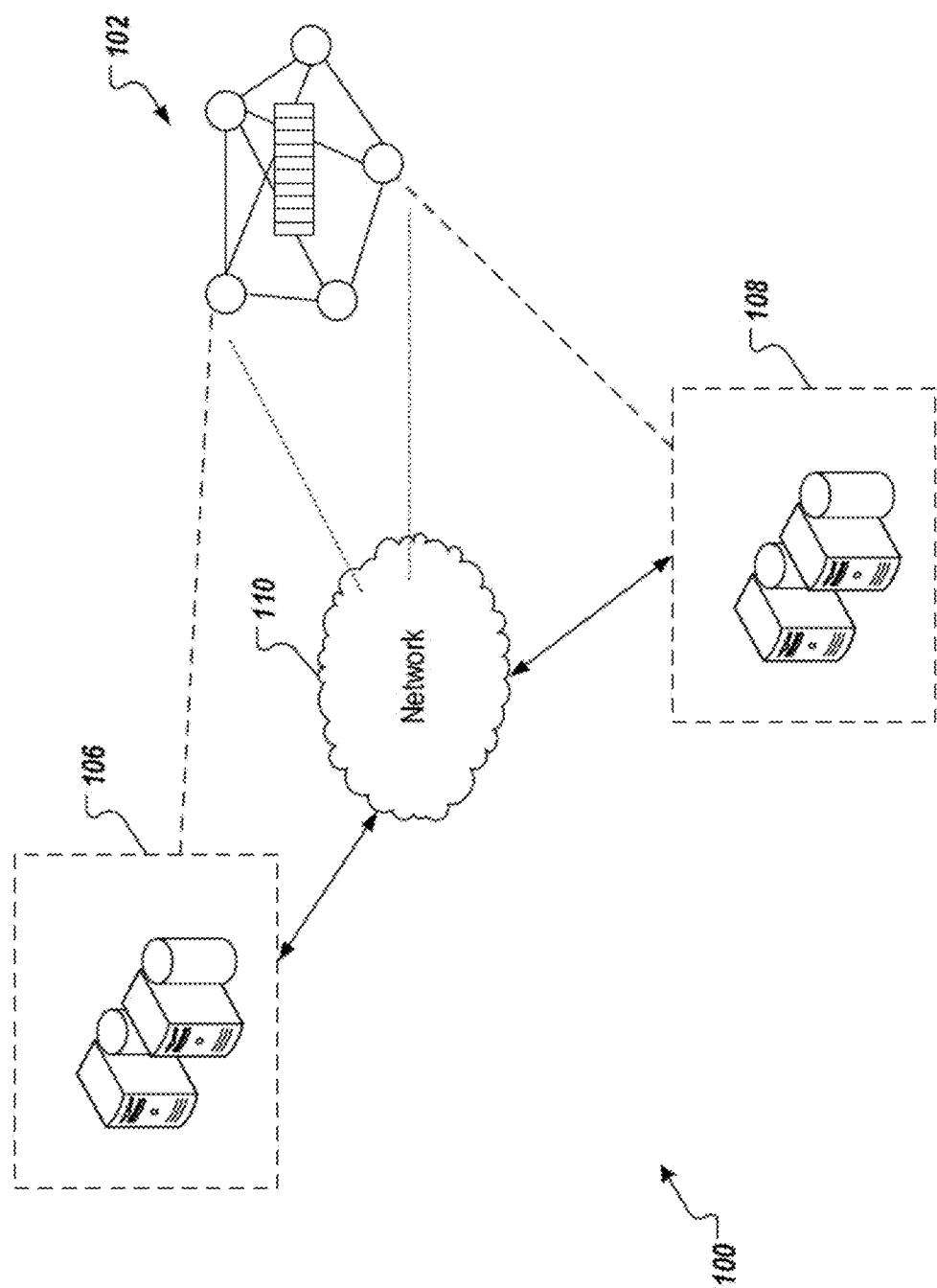
FIG. 1 is a diagram illustrating an example of an environment that can be used to execute embodiments of this specification.

This specification describes technologies for implementing a blockchain-based workflow. These technologies generally involve implementing a workflow system based on a blockchain network. A workflow can be used in highway construction, airplane manufacturing, ship building, ecommerce, or any other applications. In some embodiments, integrating a workflow with a blockchain network can help simplify implementation of the workflow and improve security and efficiency of the workflow system.

The techniques described in this specification produce several technical effects. In some embodiments, for implementing a blockchain-based workflow, a workflow specification is provided for generating a smart contract executing on a blockchain network and a configurable client service logic for one or more client devices to be executed off the blockchain network. The techniques described herein can integrate the client service logic on the client side with the smart contracts on the blockchain side to implement the workflow. In some embodiments, the smart contract includes one or more state transition methods and the configurable client service logic includes one or more client service methods. A blockchain-based workflow can include the one or more state transition methods in the smart contract and the one or more client service methods in the configurable client service logic.

In some embodiments, the smart contract stores states of the workflow and events indicating change of states into a log file on the blockchain network. By storing the states and events in the log file on the blockchain network, information about the processing status of the workflow (i.e., the states of the workflow) can be more secure and reliable since the log file on the blockchain network is immutable. In some embodiments, a change of the state and event recorded in the blockchain network may automatically trigger one or more client service methods to be executed off the blockchain network. Malicious actors cannot tamper with the information about the states and events of the workflow to compromise the network or to interfere with the normal operations of the workflow. As such, the techniques as described can improve security of the workflow system.

In some embodiments, the workflow can be a joint or collaborative workflow among multiple participants, where each participant can be associated with a client device (e.g., a client device executing the client service logic) or a network node (e.g., a consensus or a non-consensus node that is capable of executing the smart contract) of a blockchain network. In some embodiments, the multi-party blockchain-based workflow can be implemented to facilitate automatic generation of smart contracts (e.g., storing states of the blockchain network, generating state transition methods, and providing role permission control for the state transition methods) according to a workflow specification. In some embodiments, participants of the multi-party collaborative workflow can define a respective portion of the workflow specification according to individual needs and execute the client service methods of the client service logic individually. In some embodiments, the multi-party collaborative workflow can provide defined interfaces for each participant of the multi-party collaborative workflow to interact with the blockchain network, relieving the client devices from designing or negotiating compatible interfaces between each other. In some embodiments, client devices of the workflow can focus on the implementation of the client service methods without spending too much effort on details of how the client devices and the smart contract interact with each other. In some embodiments, the multi-party collaborative workflow can have better scalability and is more user friendly to the participants. The described techniques help simplify implementation of a multi-party collaborative workflow and improve efficiency of workflow systems.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing devices 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing devices 106, 108 host one or more computer-implemented services for interacting with the consortium blockchain network 102. For example, the computing device 106 can host computer-implemented services of a first entity (e.g., user A), such as a transaction management system that the first entity uses to manage its transactions with one or more other entities (e.g., other users). The computing device 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing devices 106, 108 provide nodes of the first entity, and second entity respectively, which participate in the consortium blockchain network 102.

Figure 2:
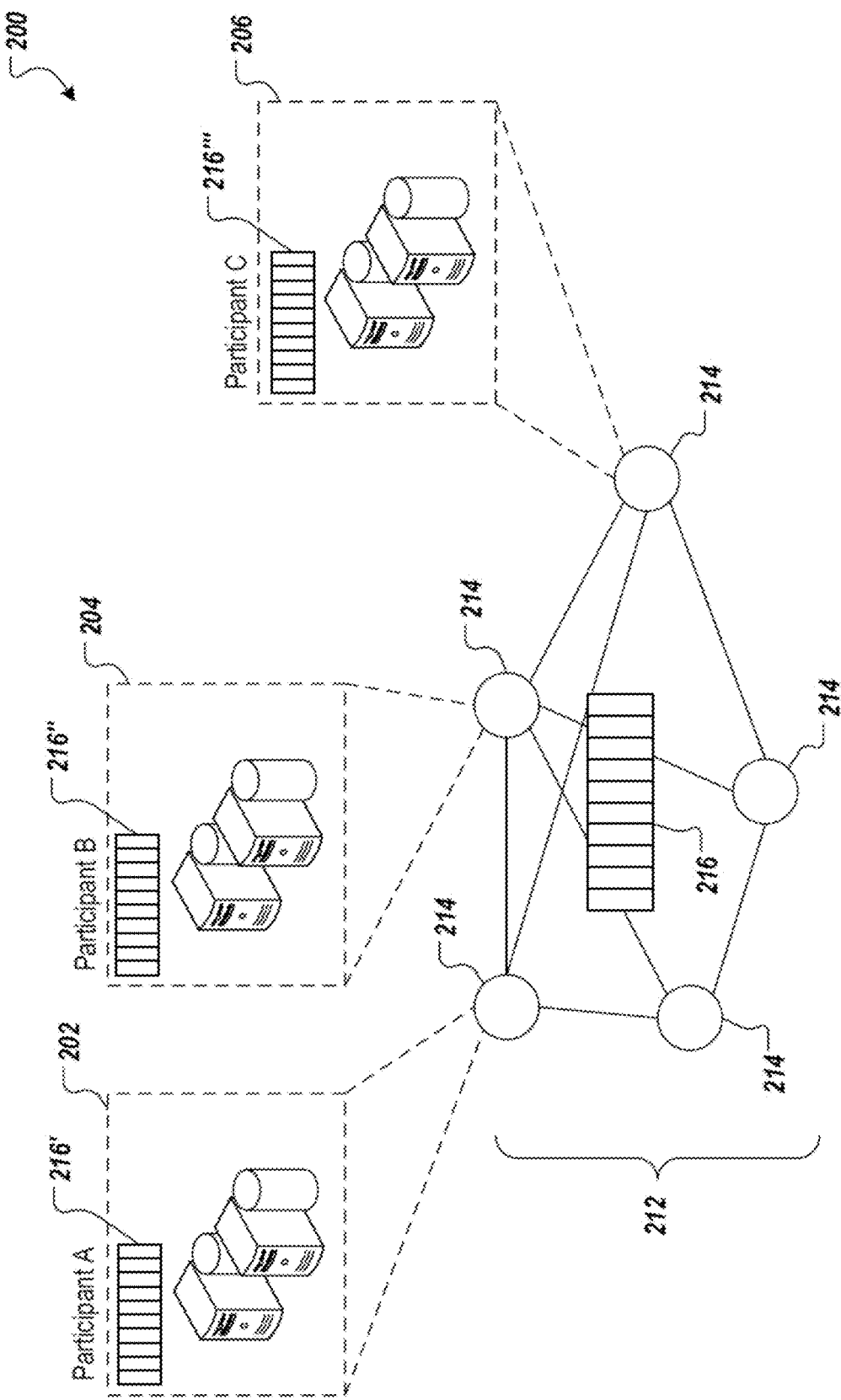
FIG. 2 is a diagram illustrating an example of an architecture in accordance with embodiments of this specification.

FIG. 2 is a diagram illustrating an example of an architecture 200 in accordance with embodiments of the specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216", and 216''' of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
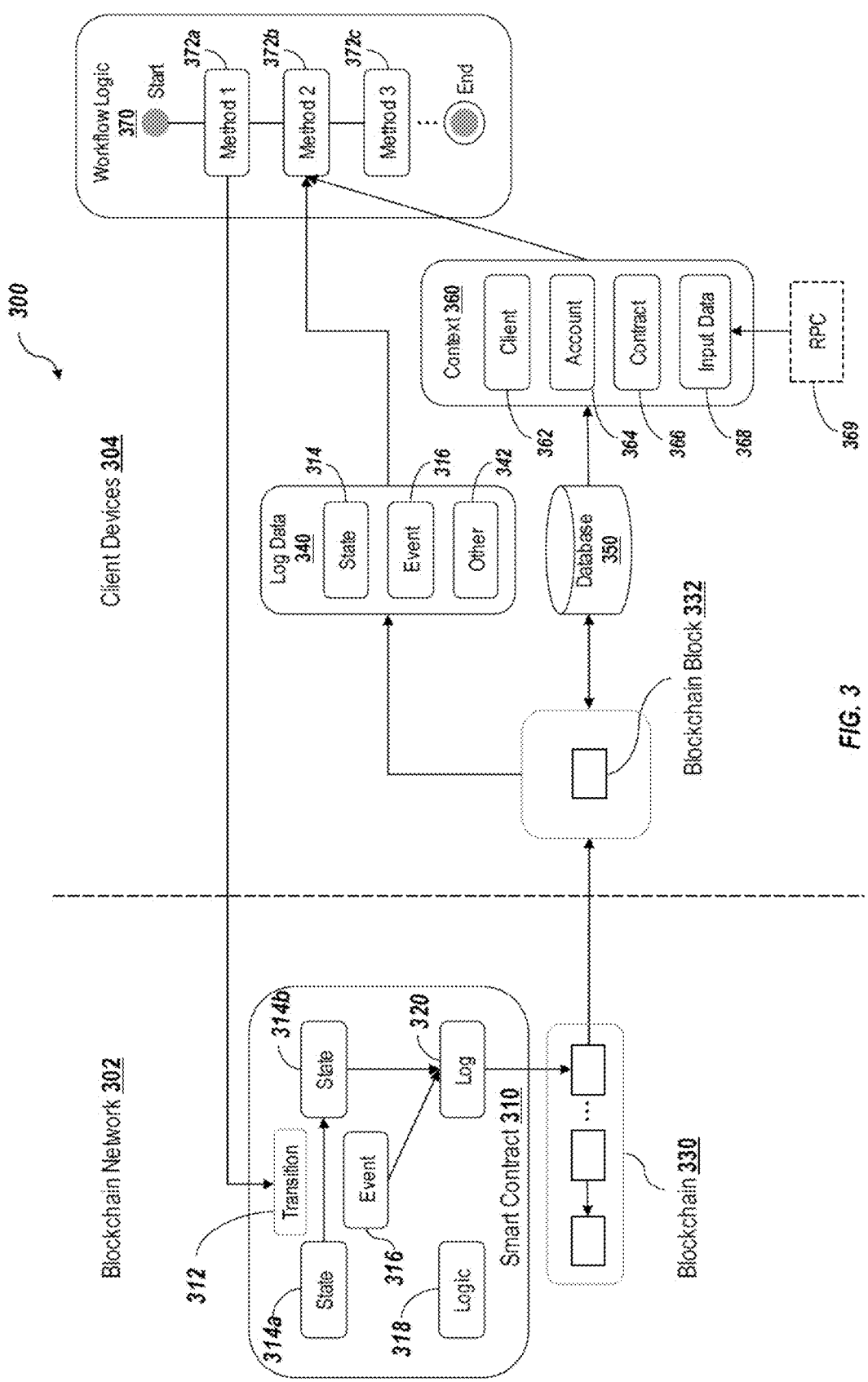
FIG. 3 is a diagram illustrating an example of a workflow system in accordance with embodiments of this specification.

FIG. 3 is a diagram illustrating an example of a system 300 in accordance with embodiments of this specification. The example system 300 implements a workflow based on a blockchain network. In some embodiments, the workflow can be a joint workflow among multiple participants and each participant can be associated with a client device or network node of a blockchain network (e.g., client devices executing the client service logic and blockchain network nodes executing the smart contract). As an example, the system 300 includes a blockchain network 302 and one or more client devices 304. In some embodiments, the blockchain network 302 can be a consortium blockchain network. A client device 304 can include, for example, any suitable computer, module, server, or computing element programmed to perform methods described herein and a database 350. The client device 304 can store log data 340, context data 360, and workflow logic 370. In some embodiments, the system 300 implements a workflow based on blockchain network 302 such that each of the participants (e.g., the client devices 304) involved in the workflow can process at least a part of the workflow and interact with other participants via the blockchain network 302 (e.g., using a smart contract (e.g., smart contract 310) executing on the blockchain network 302).

In some embodiments, a workflow can include a series of activities for completing a task. In some embodiments, each activity or step in a workflow may have a specific step before it and a specific step after it, with the exception of the first step and the last step. A workflow can be a linear workflow where the first step is usually initiated by an outside event, or a loop structure where the first step is initiated by the completion of the last step. A workflow can be automated with software tools that apply predetermined rules to decide when one step has been completed successfully and when the next step can begin. For example, a workflow system can be designed specifically to compose and execute a series of computational or data manipulation steps based on a blockchain network (e.g., blockchain network 302). Examples of computerized workflows include computer scripts that call in data, programs, and other inputs and produce outputs that can include visualizations and analytical results. These workflows may be implemented in programs using any suitable programming language such as C/C++, JAVA, R, or MATLAB, or using a scripting language such as PYTHON or PERL with a command-line interface.

A workflow system can be developed based on visual flowcharting, logic diagramming, or program coding to describe a workflow logic that is executed by the workflow participants. A workflow logic can include defined operations in one or more processes, manage and monitor the state of activities or methods in a workflow, and determine which new activity to transition to according to the defined operations, thereby facilitating the flow of information, tasks, and events. In some embodiments, a workflow logic can include functions such as (1) verifying a current process status (e.g., check whether it is valid to execute a task given a current status or state), (2) determining the authority of an executing participant (e.g., check if the participant requesting to execute the task is permitted or authorized to execute the task), and (3) executing the task (e.g., by executing a condition script after passing the previous verification, the workflow logic proceeds to execution of the task, and if the execution successfully completes, it returns a result; if not, it reports an error to a trigger or requestor of the task).

In some embodiments, one or more of a state, event, role, transition method, client service method, and context can be defined for implementing the workflow.

In some embodiments, a state of a workflow can indicate a processing status of the workflow. In some embodiments, a state can be configured to record one or more computer system events and/or user interactions. In some embodiments, a state is represented by one or more values of one or more parameters or variables defined in the workflow (e.g., as a string, one or more digits, etc.) stored in the blockchain system or network. Examples of states in an ecommerce workflow includes "Start," "Item Available," "Offer Placed," or "Accepted." Different states can be defined in other workflows such as in highway construction, airplane manufacturing, ship building, or any other applications.

In some embodiments, an event can include an indication of a transition of states of the workflow. For example, an event can indicate a state of the workflow has changed to a target state. In some embodiments, an event is represented by one or more values of one or more parameters or variables defined in the workflow (e.g., as a string, one or more digits, etc.) stored in the blockchain system or network. Examples of events include "is Start Now," "is Item Available Now," "is Offer Placed Now," "is Accepted Now," and "is Rejected Now," etc. In these examples, the event "is Start Now" can indicate that the workflow has changed to the state "Start", and the event "is Item Available Now" can indicate that the workflow has changed to the state "Item Available."

In some embodiments, the states and events are common variables used between the smart contract deployed in the blockchain network and the workflow logic of a client device. The states and events can be commonly defined and used between the smart contract and the workflow logic facilitates integration of the workflow logic of the client device with the blockchain network and the communication of states and events of the workflow among the participants of the workflow.

In some embodiments, the transition of states in the workflow can be completed by calling the state transition methods. In some embodiments, a state transition method includes a computer program or procedure that can be executed, for example, by a blockchain node executing the smart contract, to change a state of the workflow to a target state. In some embodiments, the state transition methods can log the current state, event, and other data in the smart contract. In some embodiments, a state transition method can specify at least one of the following: a name of state transition method, one or more roles that are allowed to access the state transition method, a state list including states that can be changed to another state, one or more target states, one or more events, or some optional parameters. Examples of state transition methods include "init Item," "make Offer," "accept Offer," and "reject," etc. In these examples, the state transition method "make Offer" can specify a name as "offer Price," a type as "unit 32", a role as "buyer," a state as "Item Available," a target state as "Offer Placed," and an event as "is Offer Placed Now."

In some embodiments, a client service method can be a computer program or procedure configured to detect a current state of the workflow by retrieving a blockchain block from the blockchain network. In some embodiments, if the detected state matches a predefined state, the client service method can be executed to provide a certain service to clients and generate a target state. In some embodiments, a client service method specifies a triggering state, a triggering event, and a target state. In some embodiments, the target state can be optionally defined in the client service methods. In some embodiments, a client service method can generate the target state in response to determining a current state of the workflow being the triggering state and detecting the triggering event that causes a change from the triggering state to the target state. Examples of client service methods include "Init Item Fun," "Make Offer Fun," "Accept Fun," etc. In these examples, the client service method "Make Offer Fun" can specify a triggering state "Item Available," a triggering event "is Item Available Now," a target state "offer Placed," and a function "Make Offer Fun." If it is determined that a detected state and event match the triggering state "Item Available" and triggering event "is Item Available Now" respectively, the function "Make Offer Fun" can be executed to make an offer to an item and the target state "offer Placed" is generated accordingly.

In some embodiments, the smart contract can provide better access control of the state transition methods. For example, a role can be defined to provide access control to the state transition methods. In some embodiments, each participant of the workflow is associated with a role. In the workflow with multiple participants, a state transition method may specify certain roles that have authority to execute the state transition method. Examples of the roles in an ecommerce workflow system include "Buyer," "Seller," and "Shipper." In some embodiments, a role is represented by one or more values of one or more parameters or variables defined in the workflow (e.g., as a string, one or more digits, etc.) stored in the blockchain system or network. For example, a role can include an account identity (e.g., a hash value of an account name) of a blockchain account.

In some embodiments, a context can include input data for the client service methods. In some embodiments, the context can be stored in a local data base at a client device. In some embodiments, the context can be a result returned by a remote procedure call (RPC). In some embodiments, a client device can parse the log data of the smart contract from the blockchain block and initialize the context input so that the client service methods can get the data returned by the smart contract. In some embodiments, the context includes a client name, an account name, a smart contract name, and supplemental data. Examples of supplemental data include price and quality of an item and data types (e.g., integer, etc.) of the price and quality.

In some embodiments, a workflow specification can be used to design a blockchain-based workflow system and generate a workflow logic. In some embodiments, the workflow specification can define one or more of a state, event, role, transition method, client service method, and context. In some embodiments, the workflow specification indicates one or more state transition methods to be performed by a smart contract on a blockchain network, and one or more client service methods to be executed by one or more client devices off the blockchain network participating in a workflow. In some embodiments, the workflow specification can be obtained, for example, by the coordinator of the blockchain-based workflow system (e.g., an owner or operator of the blockchain network or a third-party service provider for providing the blockchain-based workflow system). In some embodiments, the workflow specification can be negotiated and predetermined by the participants of the workflow. For example, the participants of the workflow can provide their respective client service methods (e.g., by filling a specification form or sheet), data exchanges or interactions among participants, and determine overall workflow among the participants.

In some embodiments, based on the workflow specification, one or more client service logics to be executed off the blockchain network by the one or more client devices corresponding to the participants of the workflow can be generated and provided to the respective client devices corresponding to the participants of the workflow, for example, by the coordinator of the blockchain-based workflow system.

In some embodiments, the one or more client service logics can be configurable by the respective client devices. For example, the one or more client service logics can be in the form of a SDK such that the one or more client devices can fill in or modify their respective methods as a part of the overall workflow. In some embodiments, the one or more client service logics can include defined application interfaces between or among the client service logics, or between the client service logics and the blockchain network (e.g., via the smart contract), which can provide a uniform and consistent framework to facilitate interactions among all the participants of the workflow and the blockchain network as well as improving the compatibility, scalability, flexibility, and efficiency of the workflow system.

In some embodiments, based on the workflow specification, one or more smart contracts to be executed on the blockchain network can be generated, for example, by the coordinator of the blockchain-based workflow system. The one or more smart contracts can include the one or more state transition methods. In some embodiments, the one or more smart contracts can be generated based on one or more smart contract templates with functions related to the client service methods filled in based on the workflow specification. Alternatively or additionally, the functions related to the client service methods can be filled in by one or more participants of the workflow. The one or more smart contracts can be deployed on the blockchain network and be invoked by a network node or a client device of the blockchain network. The one or more smart contracts can include defined interfaces to the coordinator of the blockchain-based workflow system and/or one or more client service logics to be executed off the blockchain network.

As an example in FIG. 3, a workflow logic 370 can be generated based on a workflow specification that specify tasks (e.g., methods 372a-c) of different workflow participants (e.g., client devices 304) and communications or interactions among the participants. In some embodiments, the workflow logic 370 is configured to include multiple client service methods 372a-c (or collectively client service methods 372) to be performed by the client devices 304 participating the workflow. Note that the workflow logic 370 is shown to include three client service methods 372a-c for illustrative purposes only. The workflow logic 370 can have any suitable number of client service methods 372. In some embodiments, the workflow logic 370 can be a configurable client service logic and the client service methods 372 can include computing procedures executed by a computing element. For example, the workflow logic 370 can be a programming logic that is stored on client devices 304 and can include the client service methods 372 to be executed by the client devices to perform certain computational operations and achieve a certain function (e.g., generate a certain output). In some embodiments, the workflow logic 370 can include a software development kit (SDK) configurable by the client devices 304 off the blockchain network 302. In some embodiments, each of the client devices 304 can be configured to execute the workflow logic 370. In some embodiments, each of the client devices 304 can be configured to execute a portion of the workflow logic 370. For example, each of the client devices 304 can be configured to execute a subset of the methods 372a-c. In some embodiments, the workflow logic 370 is generated according to a predetermined workflow specification. The workflow specification can specify a series of client service methods 372 to be performed by the client devices 304 participating the workflow.

In some embodiments, the client service methods 372 can be configured to change states of the workflow. In some embodiments, each of the client service methods 372 defines a triggering state, a triggering event, and a target state. In some embodiments, the target state can be optionally defined in the client service methods 372. In some embodiments, a client service method 372 can generate the target state in response to determining a current state of the workflow being the triggering state and detecting the triggering event that causes a change from the triggering state to the target state.

In some embodiments, the client devices 304 can constantly or regularly detect or retrieve a current state and event of the workflow from the blockchain network 302. When it is determined that the retrieved state and event match a triggering state and a triggering event of a client service method 372, respectively, and that the target state is defined in the client service method 372, the client service method 372 can be performed and the corresponding target state is generated as a result. For example, a client device 304 can retrieve a current state and event from the blockchain network 302 or can be assigned an initial state and event. In response to determining that the retrieved state and event match a triggering state and a triggering event of the client service method 372a (shown as "Method 1"), the client service method 372a can be performed by the client device 304 and a corresponding target state is generated. In some embodiments, the generation of the target state results in a call to the smart contract 310 to execute a state transition method 312 to change a state stored in the blockchain network 302 (e.g., in a log file 320 and/or blockchain 330) to the target state.

In some embodiments, the workflow logic 370 includes one or more application interfaces with one or more state transition methods 312 defined in a smart contract 310. As noted before, the workflow logic 370 can be generated according to a predetermined workflow specification. The workflow specification can also specify a number of state transition methods 312 and can be used to generate the smart contract 310 such that the smart contract 310 includes the number of state transition methods 312. In some embodiments, the smart contract 310 can be can be saved as a smart contract logic 318 and deployed and executed by the network nodes of the blockchain networks 302. In some embodiments, the smart contract 310 can be called to execute one of the state transition methods 312 to change a current state stored in the blockchain network 302 (e.g., in a log file or data 320 and/or blockchain 330) to another state.

In some embodiments, the smart contract 310 can be used for facilitating workflow implementation. In some embodiments, the smart contract 310 can include defined interfaces between each of the parties or participants of the workflow system and the blockchain network 302 (e.g., a consensus node of the blockchain network 302). In some embodiments, the smart contract 310 can include functions or operations that can be performed by each of the parties or participants of the workflow system. For example, the functions or operations can include a function for the client device 304 to call the smart contract 310 to execute one of the state transition methods 312, etc. In some embodiments, the smart contract 310 can define authorized entities for performing certain functions. The smart contract can facilitate enforcing trackable and credible interactions between the participating entities and blockchain network 302.

In some embodiments, the smart contract 310 is configured to store a number of states (e.g., states 314a-b, etc.) and events (e.g., event 316, etc.) indicating a transition of state in the smart contract 310 on the blockchain network 302. In some embodiments, the state transition methods 312 can be executed to change a current state to a target state in response to receiving an indication that the target state is reached from the client service method 372, and generate a corresponding event indicating the change of the state. For example, As an example in FIG. 3, in response to the generation of a target state by the client service method 372a, the smart contract 310 is called to execute a state transition method 312 to change a current state (e.g., state 314a) to a target state (e.g., state 314b). The state transition method 312 can also generate an event 316 indicating changing the state 314a to state 314b. The state 314b then becomes the new current state and is further stored to the log file 320 along with the event 316. The log file 320 can be further recorded in a blockchain 330 on the blockchain network 302.

In some embodiments, the smart contract 310 specifies a number of roles that are configured to provide access control to the state transition methods 312. Examples of the roles in an ecommerce workflow system include "Buyer," "Seller," and "Shipper." In some embodiments, each of the roles includes an account identity (e.g., a hash value of an account name) of a blockchain account. In some embodiments, the number of roles are configured to provide access control to the state transition methods 312 such that a blockchain account associated with one of the roles can be allowed to access one or more of the number of state transition methods 312.

In some embodiments, one of the states 314 in the smart contract 310 automatically triggers one or more client service methods 372 to be executed off the blockchain network 302. As noted, the blockchain 330 records the log file 320 that includes events 316 and states 314 of the smart contract 310. In some embodiments, the client devices 304 constantly or regularly (e.g., periodically) pull or otherwise access the blockchain 330 on the blockchain network 302 to obtain a blockchain block 332 that includes the current event 316 and state 314 of the smart contract 310. For example, a client device 304 can retrieve relevant information from a blockchain block 332 from the blockchain network 302. In some embodiments, the blockchain network 302 can push or otherwise send the blockchain block 332 to the client devices 304 periodically or when an update is available. Accordingly, the client devices 304 can obtain relevant log data from the blockchain block 332 and store them as local log data 340 in the client devices 304. In some embodiments, the log data 340 includes a current state 314 and an event 316 of the smart contract 310 and other information 342.

In some embodiments, the client device 304 can determine that the state 314 and the event 316 in the log data 340 match a triggering state and a triggering event defined in a client service method 372, respectively. In response to determining that there is a match, the client service method 372 is performed. In some embodiments, if a target state is defined in the client service method 372, the target state is generated as a result of executing the client service method 372. If a target state is not defined in the client service method 372, an output may be generated to trigger execution of a subsequent client service method 372. For example, if it is determined that a state 314 and an event 316 in the log data 340 match a triggering state and a triggering event defined in the client service method 372b (shown as "Method 2") respectively and that a target state is not defined by the client service method 372b, an output can be generated by the client service method 372b that triggers execution of the client service method 372c (shown as "Method 3").

In some embodiments, the client service methods 372 are configured to obtain a context data 360 from a database 350 for execution of the client service methods 372. As an example, the context data 360 can include a client 362 indicating a target blockchain network (e.g., the blockchain network 302 that the workflow is implemented with), a blockchain account 364 that are allowed to access data on the target blockchain network, a smart contract 366 executing on the target blockchain network, and other input data 368 from a remote procedure call (RPC) 369.

Figure 4:
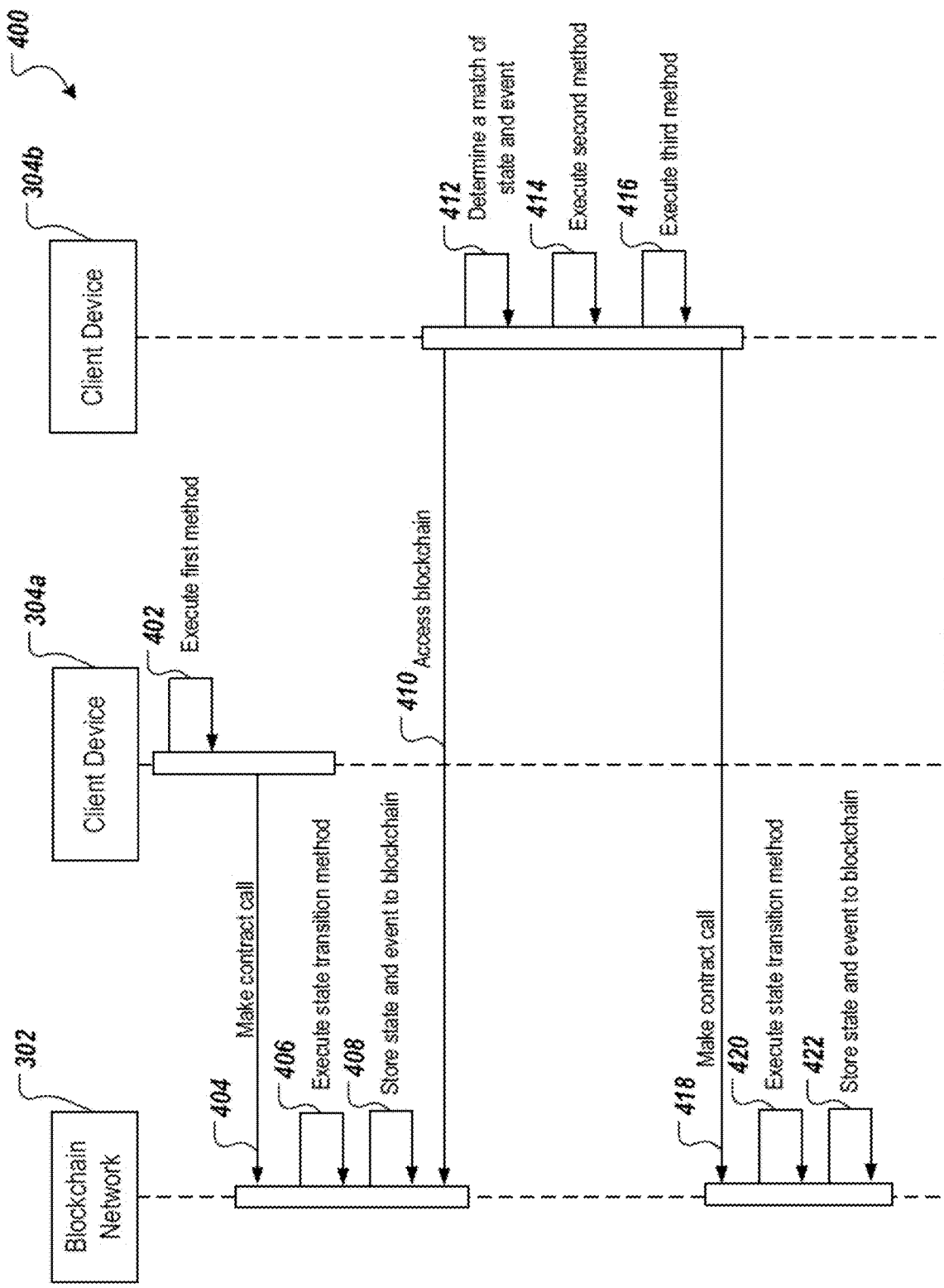
FIG. 4 is a signal flow illustrating an example of a process that can be executed in accordance with embodiments of this specification.

FIG. 4 is a signal flow illustrating an example of a process 400 that can be executed in accordance with embodiments of this specification. The signal flow represents a process 400 for implementing a blockchain-based workflow. For convenience, the process will be described as being performed by a system of one or more computers, located in one or more locations, and programmed appropriately in accordance with this specification. For example, a distributed system (e.g., the system 300 of FIG. 3), appropriately programmed, can perform the process.

At the outset, a smart contract can be generated according to a workflow specification and deployed on a blockchain network (e.g., blockchain network 302). The workflow specification can specify a number of state transition methods and can be used to generate the smart contract such that the smart contract includes the number of state transition methods. The workflow specification can also specify a series of client service methods (e.g., client service methods 372) to be performed by the client devices (e.g., client devices 304) participating the workflow. A workflow logic (e.g., workflow logic 370) can be generated according to the workflow specification such that the workflow logic includes one or more client service methods. Each of the client devices can be configured to execute the workflow logic or a portion of the workflow logic (e.g., a subset of the client service methods of the workflow logic).

At 402, client device 304a executes a first client service method in the workflow logic. In some embodiments, the first client service method defines a triggering state, a triggering event, and a target state. In some embodiments, the client device 304a retrieves a current state (e.g., "State A") and event of the smart contract from a most recent blockchain block. The client device 304a can compare them with the triggering state and triggering event, respectively. In alternative embodiments, the client device 304 can be assigned an initial state and event and compare them with the triggering state and triggering event, respectively.

Upon determining that there is a match for the triggering state and event, the client device 304a executes the first client service method and generate an output indicating the target state (e.g., "State B"). In some embodiments, the target state is associated with a state transition method of the smart contract such that execution of the state transition method results in changing a current state of the smart contract to the target state. In some embodiments, outputting the target state by the first client service method results in a contract call to the smart contract to execute the state transition method.

At 404, the client device 304a makes a contract call to the smart contract executing on the blockchain network according to the target state as determined at step 404. For example, the client device 304a can make a contract call to the smart contract to execute the state transition method associated with the target state.

At 406, the blockchain network 302 (e.g., a consensus node of the blockchain network 302) receives the contract call to the smart contract to execute the state transition method associated with the target state. The blockchain network 302 can perform a consensus process of the contract call and then execute the state transition method according to the target state from the first client service method. In some embodiments, the state transition method is executed to change a current state of the smart contract to the target state (e.g., "State B"). In some embodiments, in executing the smart contract, the blockchain network 302 determines whether a blockchain account associated with the client device 304a executing the first client service method is authorized to make a contract call to execute the state transition method. For example, a state transition method in the smart contract can be defined such that one or more roles are authorized to access the state transition method, while the other roles are not allowed to access the state transition method.

In some embodiments, the state transition method can generate an event indicating a change of the current state of the smart contract to the target state. After the state transition method is executed, the target state becomes a new current state of the smart contract.

At 408, the new current state and the event are stored to the blockchain network. In some embodiments, the state and the event are stored to a log file in the smart contract. In some embodiments, the log file is further recorded in a blockchain that is stored on the blockchain network.

In some embodiments, the client devices access the blockchain network to obtain the latest information of the blockchain. In some embodiments, each of the client devices can determine whether the state and event retrieved from the blockchain match a triggering state and triggering event defined in the client service methods executed by the client devices, respectively.

At 410, the client device 304b constantly or regularly (e.g., periodically) pulls or otherwise accesses the blockchain on the blockchain network. In some embodiments, the client device 304b can subscribe to information stored in the blockchain. In some embodiments, the blockchain network 302 can push or otherwise send to client devices constantly or regularly (e.g., periodically) information stored in the blockchain. As such, the client device 304b can obtain latest information of the blockchain including the current state and event of the smart contract.

At 412, client device 304b determines that the current state (e.g., "State B") and event retrieved from the blockchain match a triggering state and triggering event of a second client service method of the workflow logic to be executed by the client device 304b. In some embodiments, there can be multiple client service methods that are configured to be executed by the client device 304b. The client device 304b can compare the state and the event retrieved from the blockchain to the triggering state and triggering event of each client service method to determine which client service method to be execute.

At 414, the client device 304b executes the second client service method if it is determined that the state and event retrieved from the blockchain match a triggering state and triggering event of the second client service method, respectively. In some embodiments, the second client service method does not define a target state. In such case, in some embodiments, the second client service method can be executed to generate an output that triggers execution of a subsequent client service method.

At 416, the client device 304b executes a third client service method of the workflow logic if the second client service method is executed to generate an output that triggers execution of the third client service method. In some embodiments, the third client service method defines a target state (e.g., "State C"). The execution of the third client service method can result in the target state being generated (outputted) by the third client service method.

At 418, the smart contract is called by the client device 304b to execute a state transition method if the target state is defined by the third client service method and is generated by the third client service method. The state transition method can be executed to change a current state of the smart contract to the target state generated by the third client service.

At 420, after receiving the smart contract and performing a consensus process, the blockchain network 302 can execute the state transition method to change a current state (e.g., "State B") of the smart contract to the target state (e.g., "State C") generated by the third client service. In some embodiments, it is determined whether a blockchain account associated with the client device 304b executing the third client service method is authorized to make a contract call to execute the state transition method. In some embodiments, the smart contract executes the state transition method to generate an event indicating changing the current state of the smart contract to the target state. The target state becomes a new current state of the smart contract.

At 422, the new current state (e.g., "State C") and the event of the smart contract are stored to the blockchain network. In some embodiments, the state and the event are stored to the log file in the smart contract.

In some embodiments, the process 400 can include additional or different operations and interactions between the blockchain network 302 and the client devices 304a and 304b. In some embodiments, the process 400 can include additional client devices of participants of a workflow.

Figure 5:
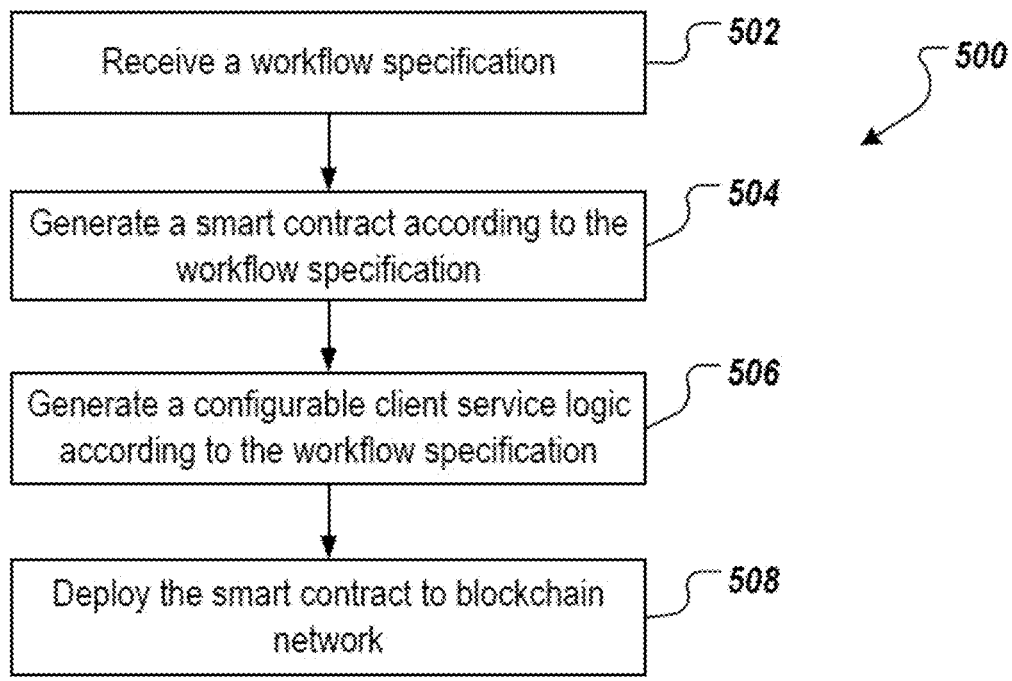
FIG. 5 is a flowchart illustrating a process that can be executed in accordance with embodiments of this specification.

FIG. 5 is a flowchart illustrating an example of a process 500 for implementation of a workflow that can be executed in accordance with embodiments of this specification. The process 500 can be a process performed by a blockchain network in the context of the process 400 of FIG. 4. For convenience, the process 500 will be described as being performed by a system of one or more computers, located in one or more locations, and programmed appropriately in accordance with this specification. For example, a distributed system, e.g., the system 300 of FIG. 3, appropriately programmed, can perform the process 500.

At 502, a workflow specification is received. In some embodiments, the workflow is received by a blockchain network (e.g., a consensus node or a non-consensus node of the blockchain network) and/or client devices off the blockchain network. In some embodiments, the workflow specification can be the workflow specification described with respect to FIG. 3. For example, the workflow specification indicates one or more state transition methods to be performed by a smart contract on the blockchain network, and one or more client service methods to be performed by one or more client devices off the blockchain network participating in a workflow.

At 504, a smart contract is generated according to the workflow specification. In some embodiments, the smart contract is to be executed on the blockchain network. In some embodiments, the smart contract includes one or more state transition methods and one or more states. In some embodiments, at least one state of the one or more states automatically triggers one or more client service methods to be executed off the blockchain network. For example, the smart contract can define a state as a triggering state and an event as a triggering event for a specified client service method executable by a specified client device. In some embodiments, as described with respect to FIGS. 3 and 4, if execution of the smart contract leads to the triggering state and the triggering event, the smart contract can automatically send a signaling or instruction to the specified client device to invoke execution of the specified client service method by the specified client device off the blockchain. The smart contract and the specified client service method include respective interfaces and logics that identify the triggering state and the triggering event for the execution of the specified client service method.

At 506, a configurable client service logic is generated according to the workflow specification for each client device of the one or more client devices. In some embodiments, the configurable client service logic is to be executed by the one or more client devices off the blockchain network. In some embodiments, the client service logic includes one or more client service methods. In some embodiments, the workflow specification specifies one or more states and events (e.g., a triggering state and a triggering event for a specified client service method) that are commonly defined between the state transition methods of the smart contract and the client service methods of the configurable client service logic. In some embodiments, at least one client service method of the one or more client service methods changes the one or more states in the smart contract. For example, as described with respect to FIGS. 3 and 4 after execution of a client service method that leads to an updated state (e.g., a target state of the client service method), the configurable client service logic can include interfaces and logics to upload or otherwise record the updated state on the blockchain and/or to trigger subsequent methods (e.g., either to be performed by the client service or other client services) specified in the workflow. In some embodiments, the client service can send a request such as a smart contract call to invoke one or more state transaction methods defined the smart contract update the state.

In some embodiments, the configurable client service logic is deployed to respective one or more client devices. In some embodiments, the client device can expand, fill, complete, compile, or otherwise configure the client service logic so the client service logic is ready to be executed on the client service off the blockchain network.

At 508, the smart contract is deployed to the blockchain network. In some embodiments, the smart contract is deployed at each consensus node of the blockchain network. In some embodiments, deploying the smart contract to the blockchain network includes compiling a script of the smart contract, creating a deploy transaction with the information of the smart contract (e.g., byte code of the smart contract, etc.), and sending the deploy transaction to a consensus node of the blockchain network. The consensus node that receives the deploy transaction can initiate a consensus procedure and distribute the deploy transaction to the other consensus nodes of the blockchain network. Each consensus node can verify the deploy transaction and if a consensus is reached among the consensus nodes, the smart contract can be successfully deployed to the blockchain network.

In some embodiments, after the smart contract is deployed to the blockchain network and the client service logic is configured by a respective client device, the process 400 as described with respect to FIG. 4 can be performed to realize the workflow specified in the workflow specification.

Figure 6:
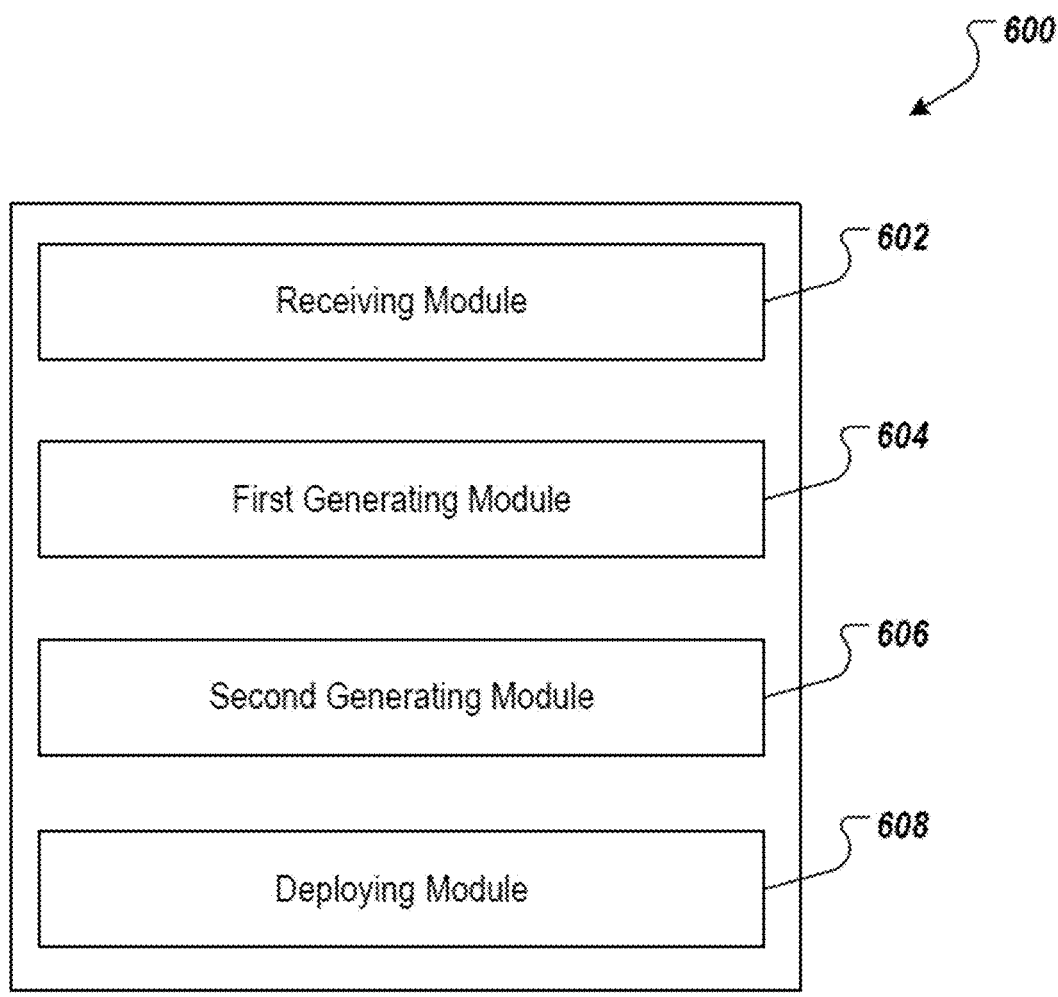
FIG. 6 depicts examples of modules of an apparatus in accordance with embodiments of this specification.

FIG. 6 depicts examples of modules of an apparatus 600 in accordance with embodiments of this specification. The apparatus 600 can be an example of an embodiment of a node of a blockchain network configured to implement a blockchain-based workflow. The apparatus 600 can correspond to the embodiments described above, and the apparatus 600 includes the following: a first receiving module 602 that receives a workflow specification, wherein the workflow specification indicates one or more state transition methods to be performed by a smart contract on a blockchain network, and one or more client service methods to be performed by one or more client devices off the blockchain network participating in a workflow; a first generating module 604 that generates, according to the workflow specification, the smart contract to be executed on the blockchain network, the smart contract including the one or more state transition methods and one or more states, and wherein at least one state of the one or more states automatically triggers the one or more client service methods to be executed off the blockchain network; a second generating module 606 that generates, according to the workflow specification and for each client device of the one or more client devices, a configurable client service logic, the configurable client service logic to be executed by the one or more client devices off the blockchain network, the client service logic including one or more client service methods, wherein at least one client service method of the one or more client service methods changes the one or more states in the smart contract; and a deploying module 608 that deploys the smart contract to the blockchain network.

In an optional embodiment, the execution of a state transition method on the blockchain network causes a transition from one state to another state. The one or more states and one or more events are stored on the blockchain network, and each of the one or more events indicates a change of state of the blockchain network.

In an optional embodiment, the smart contract further includes one or more roles, wherein the one or more roles provide access control to the one or more state transition methods such that a blockchain account associated with one of the one or more roles is permitted to access one or more of the one or more states transition methods.

In an optional embodiment, the configurable client service logic comprises one or more application interfaces that access the one or more state transition methods defined in the smart contract.

In an optional embodiment, the configurable client service logic comprises a software development kit (SDK) configurable by the client device off the blockchain network.

In an optional embodiment, at least one of the one or more client service methods defines a triggering state, a triggering event, and a target state, wherein at least one of the one or more client service methods generates the target state in response to determining a current state of the blockchain network being the triggering state and detecting the triggering event that causes a change from the triggering state to the target state.

In an optional embodiment, the apparatus 600 further includes the following: an execution sub-module that executes a state transition method to change the current state of the blockchain network to the target state in response to determining that the target state is generated by the at least one of the client service methods.

In an optional embodiment, the apparatus 600 further includes the following: a recording sub-module that records the target state as the current state and the triggering event that caused the change from the triggering state to the target state.

In an optional embodiment, the blockchain-based workflow includes the one or more state transition methods of the smart contract and the one or more client service methods of the client service logic.

The system, apparatus, module, or unit illustrated in the previous embodiments can be implemented by using a computer chip or an entity, or can be implemented by using a product having a certain function. A typical embodiment device is a computer (and the computer can be a personal computer), a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 6, it can be interpreted as illustrating an internal functional module and a structure of a blockchain-based workflow implementation apparatus. The blockchain-based workflow implementation apparatus can be an example of a blockchain network node configured to implement a blockchain-based workflow. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification.

The techniques described in this specification produce several technical effects. In some embodiments, the workflow can be a joint workflow among multiple participants and each participant can be associated with a client device or network node of a blockchain network (e.g., client devices executing the client service logic and blockchain network nodes executing the smart contract). The techniques described herein associate the client service logic on the client side with the smart contracts on the blockchain side to form a complete workflow. In some embodiments, participants of the multi-party collaborative workflow can define a respective portion of the workflow specification according to individual needs, individually implement the client service methods of the client service logic, and complete the framework of the workflow. As such, a multi-party collaboration among the participants is proposed to achieve a multi-party collaborative workflow through blockchain smart contracts and client service logic.

In some embodiments, the multi-party blockchain-based workflow can be implemented to facilitate automatic generation of smart contracts (e.g., storing states of the blockchain network, generation of state transition methods, and providing role permission control for the state transition methods) according to a workflow specification. In some embodiments, clients or users of the workflow can focus on the implementation of the client service methods without paying too much attention to the details of how the client devices and the smart contract interact with each other. As such, the described techniques address the complexity of a multi-party collaborative workflow and improve efficiency of workflow systems.

Furthermore, in some embodiments, the smart contract stores states of workflow and events indicating change of states into a log file on the blockchain network. By storing the states and events in the log file on the blockchain network, information about the processing status of the workflow (i.e., the states of the workflow) can be more secure and reliable since the log file on the blockchain network is immutable. For example, malicious actors cannot tamper with the information about the states and events of the workflow to compromise the network. As such, the techniques as described herein improve security of the computer systems, networks, and database systems implementing the techniques.

Described embodiments of the subject matter can include one or more features, alone or in combination. For example, in a first embodiment, a method for implementing a blockchain-based workflow includes: receiving a workflow specification, wherein the workflow specification indicates one or more state transition methods to be performed by a smart contract on a blockchain network, and one or more client service methods to be performed by one or more client devices off the blockchain network participating in a workflow; generating, according to the workflow specification, the smart contract to be executed on the blockchain network, the smart contract comprising the one or more state transition methods and one or more states, and where at least one state of the one or more states automatically triggers at least one of the one or more client service methods to be executed off the blockchain network; generating, according to the workflow specification and for each client device of the one or more client devices, a configurable client service logic, the configurable client service logic to be executed by the one or more client devices off the blockchain network, the client service logic comprising one or more client service methods, wherein at least one client service method of the one or more client service methods changes the one or more states in the smart contract; and deploying the smart contract to the blockchain network.

In other embodiments, one or more of an apparatus, a non-transitory computer-readable storage medium, and a system are provided for implementing the methods provided herein. For example, an apparatus can be a cloud server or a network node of a blockchain network for implementing the methods provided herein. As another example, a system can include a cloud server, one or more client devices, and one or more blockchain network for implementing the methods provided herein.

The foregoing and other described embodiments can each, optionally, include one or more of the following features:

A first feature, combinable with any of the following features, specifies that execution of a state transition method on the blockchain network causes a transition from one state to another state, wherein the one or more states and one or more events are stored on the blockchain network, and wherein each of the one or more events indicates a change of a state of the blockchain network.

A second feature, combinable with any of the previous or following features, specifies that the smart contract further comprises one or more roles, wherein the one or more roles provide access control to the one or more state transition methods such that a blockchain account associated with one of the one or more roles is permitted to access one or more of the one or more states transition methods.

A third feature, combinable with any of the previous or following features, specifies that the configurable client service logic comprises one or more application interfaces that access the one or more state transition methods defined in the smart contract.

A fourth feature, combinable with any of the previous or following features, specifies that the configurable client service logic comprises a software development kit (SDK) configurable by the client device off the blockchain network.

A fifth feature, combinable with any of the previous or following features, specifies that the at least one of the one or more client service methods defines a triggering state, a triggering event, and a target state, wherein the at least one of the one or more client service methods generates the target state in response to determining a current state of the blockchain network being the triggering state and detecting the triggering event that causes a change from the triggering state to the target state.

A sixth feature, combinable with any of the previous or following features, specifies that the method further includes: in response to determining that the target state is generated by the at least one of the client service methods, executing, by the blockchain network, a state transition method to change the current state of the blockchain network to the target state.

A seventh feature, combinable with any of the previous or following features, specifies that the method further includes: recording, by the blockchain network, the target state as the current state and the triggering event that caused the change from the triggering state to the target state.

An eighth feature, combinable with any of the previous or following features, specifies that the blockchain-based workflow comprises the one or more state transition methods of the smart contract and the one or more client service methods of the client service logic.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for implementing a blockchain-based workflow, the computer-implemented method comprising:

receiving a workflow specification, wherein the workflow specification indicates one or more state transition methods to be performed by a smart contract on a blockchain network, and one or more client service methods to be executed by a plurality of client devices off the blockchain network participating in a workflow;

generating, according to the workflow specification, the smart contract to be executed on the blockchain network, the smart contract comprising the one or more state transition methods and one or more states, and wherein at least one state of the one or more states automatically triggers at least one of the one or more client service methods to be executed off the blockchain network, wherein the at least one of the one or more client service methods defines a triggering state, a triggering event, and a target state, wherein the at least one of the one or more client service methods generates the target state in response to determining a current state of the blockchain network being the triggering state and detecting the triggering event that causes a change from the triggering state to the target state;

generating, according to the workflow specification and for each client device of the plurality of client devices, a configurable client service logic;

sending, to each of the plurality of client devices, the configurable client service logic, the configurable client service logic to be modified, deployed, and executed by each of the plurality of client devices off the blockchain network, the configurable client service logic comprising one or more client service methods, wherein at least one client service method of the one or more client service methods changes the one or more states in the smart contract;

deploying the smart contract to the blockchain network;

in response to determining that the target state is generated by the at least one of the one or more client service methods, executing a state transition method to change the current state of the blockchain network to the target state;

recording the target state as the current state of the blockchain network;

sending, to a second client device, the target state, wherein the target state is a second triggering state of a second client service method executable by the second client device to output a second target state;

receiving, from the second client device, a request to execute a second state transition method to change the current state of the blockchain network to the second target state;

executing the second state transition method to change the current state of the blockchain network to the second target state; and recording the second target state as the current state of the blockchain network.

2. The computer-implemented method of claim 1, wherein execution of a state transition method on the blockchain network causes a transition from one state to another state, wherein the one or more states and one or more events are stored on the blockchain network, and wherein each of the one or more events indicates a change of a state of the blockchain network.

3. The computer-implemented method of claim 2, wherein the smart contract further comprises one or more roles, wherein the one or more roles provide access control to the one or more state transition methods, such that a blockchain account associated with one of the one or more roles is permitted to access one or more of the one or more states transition methods.

4. The computer-implemented method of claim 2, wherein the configurable client service logic comprises one or more application interfaces that access the one or more state transition methods defined in the smart contract.

5. The computer-implemented method of claim 2, wherein the execution of the state transition method on the blockchain network is in response to a request made by one of the plurality of client devices after the one of the plurality of client devices executes a service method on the one of the plurality of client devices off the blockchain network.

6. The computer-implemented method of claim 1, wherein the configurable client service logic comprises a software development kit (SDK) configurable by the plurality of client devices off the blockchain network.

7. The computer-implemented method of claim 1, further comprising:

recording the triggering event that caused the change from the triggering state to the target state in the blockchain network.

8. The computer-implemented method of claim 1, wherein the blockchain-based workflow comprises the one or more state transition methods of the smart contract and the one or more client service methods of the configurable client service logic.

9. A non-transitory, computer-readable storage medium storing one or more instructions executable by a computer system to perform operations for implementing a blockchain-based workflow, the operations comprising:

receiving a workflow specification, wherein the workflow specification indicates one or more state transition methods to be performed by a smart contract on a blockchain network, and one or more client service methods to be executed by a plurality of client devices off the blockchain network participating in a workflow;

generating, according to the workflow specification, the smart contract to be executed on the blockchain network, the smart contract comprising the one or more state transition methods and one or more states, and wherein at least one state of the one or more states automatically triggers at least one of the one or more client service methods to be executed off the blockchain network, wherein the at least one of the one or more client service methods defines a triggering state, a triggering event, and a target state, wherein the at least one of the one or more client service methods generates the target state in response to determining a current state of the blockchain network being the triggering state and detecting the triggering event that causes a change from the triggering state to the target state;

generating, according to the workflow specification and for each client device of the plurality of client devices, a configurable client service logic;

sending, to each of the plurality of client devices, the configurable client service logic, the configurable client service logic to be modified, deployed, and executed by each of the plurality of client devices off the blockchain network, the configurable client service logic comprising one or more client service methods, wherein at least one client service method of the one or more client service methods changes the one or more states in the smart contract;

deploying the smart contract to the blockchain network;

in response to determining that the target state is generated by the at least one of the one or more client service methods, executing a state transition method to change the current state of the blockchain network to the target state;

recording the target state as the current state of the blockchain network;

sending, to a second client device, the target state, wherein the target state is a second triggering state of a second client service method executable by the second client device to output a second target state;

receiving, from the second client device, a request to execute a second state transition method to change the current state of the blockchain network to the second target state;

executing the second state transition method to change the current state of the blockchain network to the second target state; and recording the second target state as the current state of the blockchain network.

10. The non-transitory, computer-readable storage medium of claim 9, wherein execution of a state transition method on the blockchain network causes a transition from one state to another state, wherein the one or more states and one or more events are stored on the blockchain network, and wherein each of the one or more events indicates a change of a state of the blockchain network.

11. The non-transitory, computer-readable storage medium of claim 10, wherein the smart contract further comprises one or more roles, wherein the one or more roles provide access control to the one or more state transition methods, such that a blockchain account associated with one of the one or more roles is permitted to access one or more of the one or more states transition methods.

12. The non-transitory, computer-readable storage medium of claim 10, wherein the configurable client service logic comprises one or more application interfaces that access the one or more state transition methods defined in the smart contract.

13. The non-transitory, computer-readable storage medium of claim 10, wherein the execution of the state transition method on the blockchain network is in response to a request made by one of the plurality of client devices after the one of the plurality of client devices executes a service method on the one of the plurality of client devices off the blockchain network.

14. The non-transitory, computer-readable storage medium of claim 9, wherein the configurable client service logic comprises a software development kit (SDK) configurable by the plurality of client devices off the blockchain network.

15. The non-transitory, computer-readable storage medium of claim 9, the operations further comprising:
recording the triggering event that caused the change from the triggering state to the target state in the blockchain network.

16. The non-transitory, computer-readable storage medium of claim 9, wherein the blockchain-based workflow comprises the one or more state transition methods of the smart contract and the one or more client service methods of the configurable client service logic.

17. A system for implementing a blockchain-based workflow, comprising:
one or more processors; and one or more computer-readable memories coupled to the one or more processors and having instructions stored thereon that are executable by the one or more processors to perform operations comprising:
receiving a workflow specification, wherein the workflow specification indicates one or more state transition methods to be performed by a smart contract on a blockchain network, and one or more client service methods to be executed by a plurality of client devices off the blockchain network participating in a workflow;
generating, according to the workflow specification, the smart contract to be executed on the blockchain network, the smart contract comprising the one or more state transition methods and one or more states, and wherein at least one state of the one or more states automatically triggers at least one of the one or more client service methods to be executed off the blockchain network, wherein the at least one of the one or more client service methods defines a triggering state, a triggering event, and a target state, wherein the at least one of the one or more client service methods generates the target state in response to determining a current state of the blockchain network being the triggering state and detecting the triggering event that causes a change from the triggering state to the target state;
generating, according to the workflow specification and for each client device of the plurality of client devices, a configurable client service logic;
sending, to each of the plurality of client devices, the configurable client service logic, the configurable client service logic to be modified, deployed, and executed by each of the plurality of client devices off the blockchain network, the configurable client service logic comprising one or more client service methods, wherein at least one client service method of the one or more client service methods changes the one or more states in the smart contract;
deploying the smart contract to the blockchain network;
in response to determining that the target state is generated by the at least one of the one or more client service methods, executing a state transition method to change the current state of the blockchain network to the target state;
recording the target state as the current state of the blockchain network;
sending, to a second client device, the target state, wherein the target state is a second triggering state of a second client service method executable by the second client device to output a second target state;
receiving, from the second client device, a request to execute a second state transition method to change the current state of the blockchain network to the second target state;
executing the second state transition method to change the current state of the blockchain network to the second target state; and
recording the second target state as the current state of the blockchain network.

18. The system of claim 17, wherein execution of a state transition method on the blockchain network causes a transition from one state to another state, wherein the one or more states and one or more events are stored on the blockchain network, and wherein each of the one or more events indicates a change of a state of the blockchain network.

19. The system of claim 18, wherein the smart contract further comprises one or more roles, wherein the one or more roles provide access control to the one or more state transition methods, such that a blockchain account associated with one of the one or more roles is permitted to access one or more of the one or more states transition methods.

20. The system of claim 18, wherein the configurable client service logic comprises one or more application interfaces that access the one or more state transition methods defined in the smart contract.

21. The system of claim 18, wherein the execution of the state transition method on the blockchain network is in response to a request made by one of the plurality of client devices after the one of the plurality of client devices executes a service method on the one of the plurality of client devices off the blockchain network.

22. The system of claim 17, wherein the configurable client service logic comprises a software development kit (SDK) configurable by the plurality of client devices off the blockchain network.

23. The system of claim 17, the operations further comprising:
recording the triggering event that caused the change from the triggering state to the target state in the blockchain network.

24. The system of claim 17, wherein the blockchain-based workflow comprises the one or more state transition methods of the smart contract and the one or more client service methods of the configurable client service logic.

* * * * *